(12) United States Patent
Jin et al.

(10) Patent No.: US 12,530,713 B2
(45) Date of Patent: Jan. 20, 2026

(54) SYSTEMS, METHODS, AND NON-TRANSITORY COMPUTER READABLE STORAGE MEDIUMS FOR SELECTION OF CANDIDATE CONTENT ITEMS

(71) Applicant: STRIPE, INC., South San Francisco, CA (US)

(72) Inventors: Jimmy Jin, Oakland, CA (US); Hassaan Markhiani, Sugar Land, TX (US)

(73) Assignee: STRIPE, INC., South San Francisco, CA (US)

(*) Notice: Subject to any disclaimer, the term of this patent is extended or adjusted under 35 U.S.C. 154(b) by 200 days.

(21) Appl. No.: 17/897,084

(22) Filed: Aug. 26, 2022

(65) Prior Publication Data
US 2024/0070759 A1    Feb. 29, 2024

(51) Int. Cl.
*G06Q 30/00* (2023.01)
*G06Q 30/0601* (2023.01)

(52) U.S. Cl.
CPC .................. *G06Q 30/0639* (2013.01)

(58) Field of Classification Search
CPC .................. G06Q 30/00; G06Q 30/0639
See application file for complete search history.

(56) References Cited

U.S. PATENT DOCUMENTS

| | | | | |
|---|---|---|---|---|
| 10,289,296 B1* | 5/2019 | Zhang | .............. | G06F 40/14 |
| 11,113,715 B1* | 9/2021 | Schmutz | .............. | H04L 67/02 |
| 11,126,785 B1* | 9/2021 | Nassif | .............. | G06Q 30/0244 |
| 11,716,303 B1* | 8/2023 | Singh | .............. | G06F 16/24578 |
| | | | | 709/206 |
| 2017/0061481 A1* | 3/2017 | Wee | .............. | G06Q 30/0201 |
| 2017/0140053 A1* | 5/2017 | Vorobev | .............. | G06N 20/00 |
| 2020/0074333 A1* | 3/2020 | Bandyopadhyay | .... | G06N 5/048 |
| 2020/0082439 A1* | 3/2020 | Leteux | .............. | G06Q 40/03 |
| 2021/0142118 A1* | 5/2021 | Lugt | .............. | G06F 18/24765 |
| 2021/0174164 A1* | 6/2021 | Hsieh | .............. | G06F 16/24578 |

(Continued)

OTHER PUBLICATIONS

Hanna, Osama, "Solving Multi-Arm Bandit Using a Few Bits of Communication", Circa 2022, Proceedins of the Machine Learning Research. (Year: 2022).*

(Continued)

*Primary Examiner* — Arielle E Weiner
(74) *Attorney, Agent, or Firm* — BAKERHOSTETLER

(57) ABSTRACT

Examples of the present disclosure describe improved systems and methods for selection of candidate content items. In one example implementation a system includes a processor and a memory coupled to the processor. The memory includes a plurality of sets of requirements. Each set of requirements may be associated with a corresponding available content item of a plurality of available content items. A comparison module may be configured to compare a set of user parameters to each set of requirements and select two or more candidate content items from the plurality of available content items based on the set of user parameters satisfying the set of requirements. A bandit module may be configured to select one elected content item from the two or more candidate content items using a multi-armed bandit model. A user interface module may be configured to transmit the elected content item.

20 Claims, 6 Drawing Sheets

(56) References Cited

U.S. PATENT DOCUMENTS

2022/0019689 A1* 1/2022 Lau .................. G06F 21/6245
2022/0284476 A1* 9/2022 Yang ................. G06Q 30/0277
2022/0300999 A1* 9/2022 Ortiz ..................... H04L 63/10
2024/0070759 A1* 2/2024 Jin ................... G06Q 30/0639

OTHER PUBLICATIONS

A. Lacerda, "Contextual Bandits for Multi-objective Recommender Systems," 2015 Brazilian Conference on Intelligent Systems (BRACIS), Natal, Brazil, 2015, pp. 68-73, doi: 10.1109/BRACIS.2015.67. (Year: 2015).*

* cited by examiner

SYSTEMS, METHODS, AND NON-TRANSITORY COMPUTER READABLE STORAGE MEDIUMS FOR SELECTION OF CANDIDATE CONTENT ITEMS

BACKGROUND

Many user interfaces for software services and software systems include portions that serve as containers for displaying different content. Interactive content items may be available to be displayed within the containers via a web-based platform to a user. The interactive content item selected to be displayed to the user may be determined based on a relevance to the user.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for selection of candidate content items. In some examples, a machine learning model, such as a multi-armed bandit model, observes the performance of different candidate content items over time and selects one candidate content item (e.g. an elected content item) to be displayed within the container in the web-based platform, based on the observed performance. In some examples, that performance is measured quantitatively, using a metric such as observed click-through rate (e.g. how often a user "clicks" or interacts with a candidate content item).

As will be understood from the following disclosure, one example of the technology may relate to a system for selection of candidate content items. In one example implementation, the system includes a processor and a memory coupled to the processor. The memory may include a plurality of sets of requirements. Each set of requirements may be associated with a corresponding available content item of a plurality of available content items. A comparison module may be configured to compare a set of user parameters to each set of requirements and select two or more candidate content items from the plurality of available content items based on the set of user parameters satisfying the set of requirements. A bandit module may be configured to select one elected content item from the two or more candidate content items using a multi-armed bandit model. A user interface module may be configured to transmit the elected content item.

In another example, the technology may relate to a computer-implemented method. In an example implementation, each set of requirements of a plurality of sets of requirements may be associated with a corresponding available content item of a plurality of available content items. A set of user parameters may be compared to each set of requirements, and two or more candidate content items may be selected from the plurality of available content items based on the set of user parameters satisfying the set of requirements. One elected content item may be selected from the two or more candidate content items using a multi-armed bandit model. The elected content item may then be transmitted to a user interface.

In another example, the technology may relate to a system for selection of candidate content items. In an example implementation, the system may include at least a processor and a memory coupled to the processor. The memory may include computer readable instructions that, when executed by the processor perform a method. In the method, each set of requirements of a plurality of sets of requirements may be associated with a corresponding available content item of a plurality of available content items. A set of user parameters may be compared to each set of requirements and two or more candidate content items may be selected from the plurality of available content items based on the set of user parameters satisfying the set of requirements. One elected content item may be selected from the two or more candidate content items using a multi-armed bandit model. The elected content item may be transmitted to a user interface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Examples are described with reference to the following figures.

DETAILED DESCRIPTION

Figure 1:
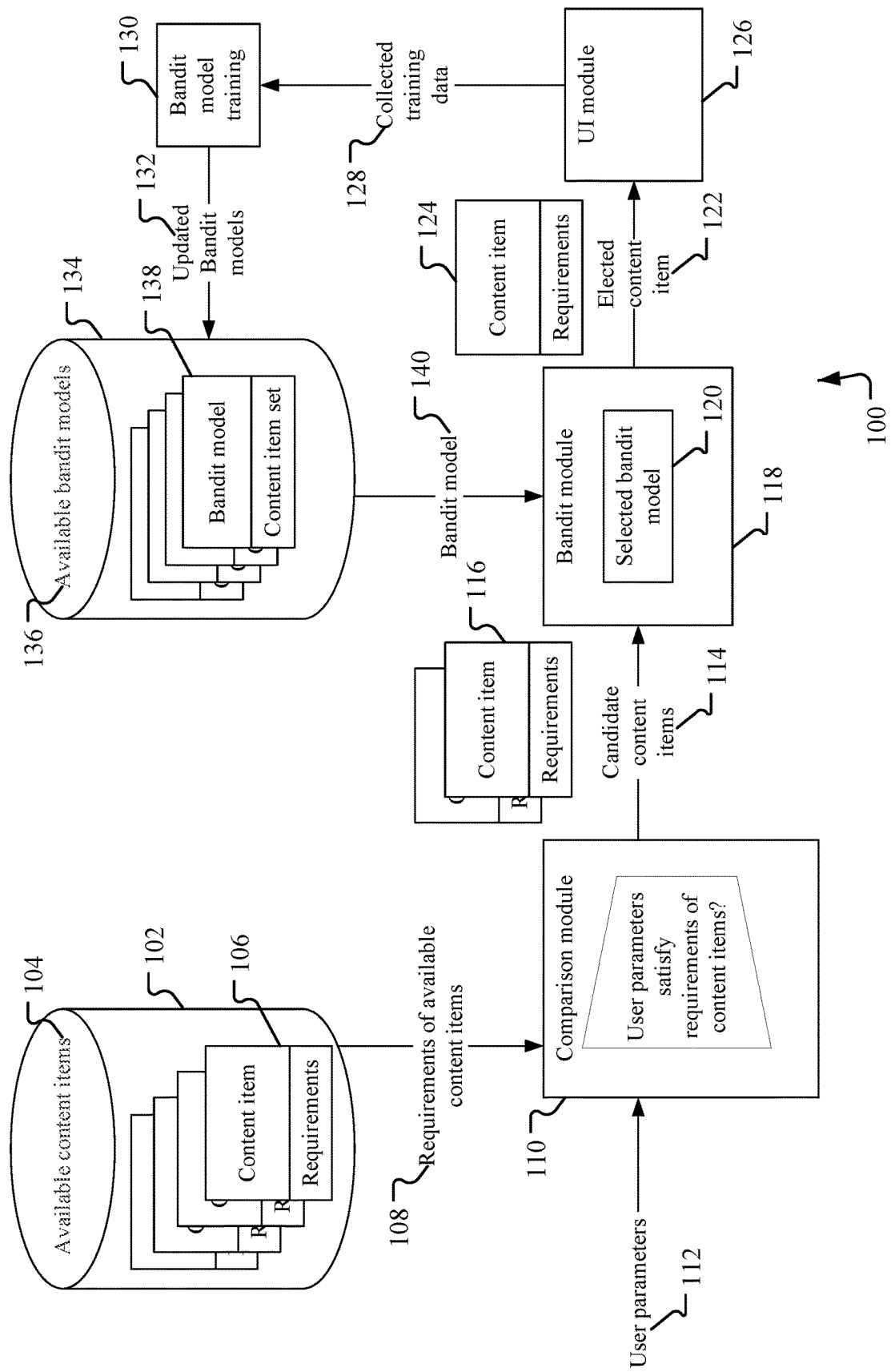
FIG. 1 illustrates an overview of an example system for selection of candidate content items.

User interface frameworks and toolkits provide building blocks for software developers to construct web pages, mobile apps, desktop applications, and the like, for users to interact with computer systems. One common example of such a user interface is a web-based dashboard that provides users with information about various services provided to the user by a service provider (e.g. in the case where the user is a retail business, graphs of current traffic to the user's retail website alongside revenue information, and most popular purchases made by the user's customers). These user interface frameworks also help multiple teams of software developers to coordinate by providing a common foundation for the different teams to build upon, such that user interface components developed by different teams can be easily integrated into an overall user interface. One approach to a user interface modularization framework defines portions of a display ("viewports") on a dashboard where different available content items can be displayed. The dashboard is one example of a user interface that includes dynamic content, but the systems and methods described herein are not limited thereto. The user interface modularization framework may allow a user to designate available content items to appear in a predefined spot on the display. The framework may be context-aware, so different available content items may be shown to different users. Each viewport may have multiple possible available content items that could be displayed within it; therefore, systems and methods are needed for the purpose of selecting, for each user session context, which available content item should be loaded and displayed into the viewport. In examples, an experience engine is a backend service that implements at least portions of the systems and methods for the selection of candidate content items from a set of available content items. The experience engine may implement a ranking model which assigns each available content item an integer score, such that higher scores signify that the particular available content item is preferred in a certain context. In an implementation, a set of user parameters is used to select a most relevant candidate content item to display to a user. In examples, the parameter database utilized to store the set of user parameters may be stored in a parameter database, such as a key/value database, or the like. In examples, the set of user parameters may be updated on a regular basis and stored in the parameter database. The top-scoring available content item may then be loaded into the viewport.

However, this model, as implemented by the experience engine, may result in ties between eligible or top-scoring available content items in their ranking, which ties must be broken in order to select a single elected content item to display for each tie that occurs. Therefore, some aspects of the present technology relate to supplementing the ranking model with a multi-armed bandit model to select an elected content item from between two or more candidate content items selected from the available content items and break the tie. In some implementations, the multi-armed bandit model uses observed click-through rate ("CTR") of tied eligible or top-scoring candidate content items in order to break the tie. In implementations, the multi-armed bandit model selects eligible candidate content items when there is a tie and gradually directs more traffic to those candidate content items that show a higher CTR. In various implementations, other data may be used by the multi-armed bandit model to break the tie such as, for example, explicit feedback buttons (e.g. show more of this, show less of this), implicit feedback (e.g. hover, time on screen), and the like.

When presented with a set of tied candidate content items, the disclosed systems and methods may be configured to select a higher-performing candidate content item (e.g. in terms of CTR) based on the observed data (e.g. CTR data for a particular user). In further implementations, the disclosed systems and methods randomly or probabilistically select one of the tied candidate content items as weighted based on their performance (e.g. in terms of CTR) and thereby would retain the ability to observe the performance of other candidate content items, thereby avoiding the problem of getting stuck in local minima (e.g. due to poor starting conditions or evolution in performance of the candidate content item over time). In implementations, each available content item is associated with a set of requirements (e.g. Resolvers) that specify conditions governing which available content items apply to which users, based on the set of user parameters. In various implementations, machine learning models are used to ingest observations made on the performance of available content items in order to reconfigure the multi-armed bandit model with updated user interaction data.

In various implementations, the described systems and methods improve upon previous systems and methods by automating the process of selecting an ideal experience for a user, reducing potential user error during configuration, and by allowing separate development teams to generate available content items, at will, that may target particular viewports, and that may have specific requirements.

Turning now to FIG. 1, an example system for selection of candidate content items is illustrated. Example system 100, as illustrated, is a combination of interdependent components that interact to form an integrated whole. Components of system 100 may be hardware components or software components (e.g., applications, application programming interfaces (APIs), modules, virtual machines, or runtime libraries) implemented on and/or executed by hardware components of system 100. In one example, the components of systems disclosed herein are distributed across multiple processing devices. For instance, input may be entered on a user device or client device and information may be processed on or accessed from other devices in a network, such as a network device or a cloud device. One of skill in the art will appreciate that the scale and structure of systems such as system 100 may vary and may include additional or fewer components than those described in FIG. 1.

In the illustrated implementation depicted in FIG. 1, a plurality of available content items 104 is stored in content database 102. Each available content item 106 has a corresponding set of requirements that is associated with it. In examples, each content item 106 includes an AppView. In examples, an AppView may include interactive content such as promotional content, services, announcements, widgets, applications, and the like. In the user interface framework, according to an example, multiple available content items may be attached to a specific viewport. A backend service, such as the experience engine, may implement the selecting of which available content item is best for each given user and/or session context.

In various implementations, before a tie between candidate content items is detected, a selection between available content items to display, using a scoring module 113, may proceed as follows. A resolver includes a collection of Boolean functions that define whether an available content item is eligible to be displayed or to generate a ranking score for each available content item to indicate whether one eligible available content item is selected to be shown over another eligible available content item. In examples, a resolver determines whether a user context satisfies a set of requirements and returns a Boolean value that reflects whether the set of requirements was satisfied. In examples, the sets of requirements are associated with available content items to indicate which conditions should be checked for that available content item. In examples, the function can be used either in a requirements capacity or a preference capacity. If a function is used in a requirements capacity, then its return value determines whether the available content item should be filtered out of the set of eligible available content items for the given viewport and user context. If a function is used in a preference capacity, then its return value is mapped to a 1 or 0 score or a score within a range, such as in the range from 0 to 100, and the scores for all requirements associated with the available content items are summed to give a total integer ranking score for the available content item.

Using the improved systems and methods described herein, ties may be broken between candidate content items to be displayed. In various implementations, each set of requirements includes, for example, parameters that govern which available content item applies to which user, such as user location, average transaction size, and the like. In examples, content database 102 may be implemented as a physical or cloud-based database, or may be stored in the memory of a single device, or the like. In various implementations, the sets of requirements 108 associated with each of the available content items is input into a comparison module 110. User parameters 112 are also input into the comparison module 110. When choosing between a set of available content items to show, an experience engine that implements the system may make its selection using three stages: (1) the requirements check, (2) the user parameters check, and (3) the tiebreaking. Comparison module 110 is configured to compare the set of user parameters 112 to each set of requirements 108. If the set of user parameters 112 satisfies the set of requirements 108, then comparison module 110 selects two or more candidate content items 116 that are fed as input 114 into bandit module 118. Bandit module 118 is configured to select one elected content item 124 from the two or more candidate content items 116 using selected multi-armed bandit model 120. The elected content item 124 is fed as input 122 into user interface ("UP") module 126. UI module 126 is configured to transmit the elected content item to a display of a computing device, within the viewport, or the like.

As illustrated in FIG. 1, UI module 126 may also be configured to collect training data 128 that is input into a bandit training module 130. The training data 128 may be collected by observing user interaction with displayed elected content items. In examples, training data 128 includes user interaction and the like. The bandit training module 130 may be configured to consume the training data 128, to generate updated bandit models 132 and provide those updated bandit models 132 to a bandit model database 134. In examples, the updated bandit models 132 are updated on a routine basis, such as on a daily or weekly basis in an offline learning process. In some examples, an online learning process is used, in which the updated bandit models 132 are generated after every user interaction 128 received from the UI module 126. In examples, bandit model database 134 may be implemented on a single computing device or as part of a distributed system. Bandit model database 134 is configured to store available bandit models 136. Each bandit model 138 is associated with a set of content items. In examples, a multi-armed bandit model 140 is input into the bandit module 118. Thereby, the system learns and is adapted to new user interaction data, keeping the multi-armed bandit model 120 up to date with the most current and relevant user data.

Having described a system that may be employed by the aspects disclosed herein, this disclosure will now describe one or more methods that may be performed by various aspects of the disclosure. In aspects, methods 200 may be executed by a system, such as system 100 of FIG. 1. However, method 200 is not limited to such examples. In other aspects, method 200 is performed by a single device or component that integrates the functionality of the components of system 100.

Figure 2:
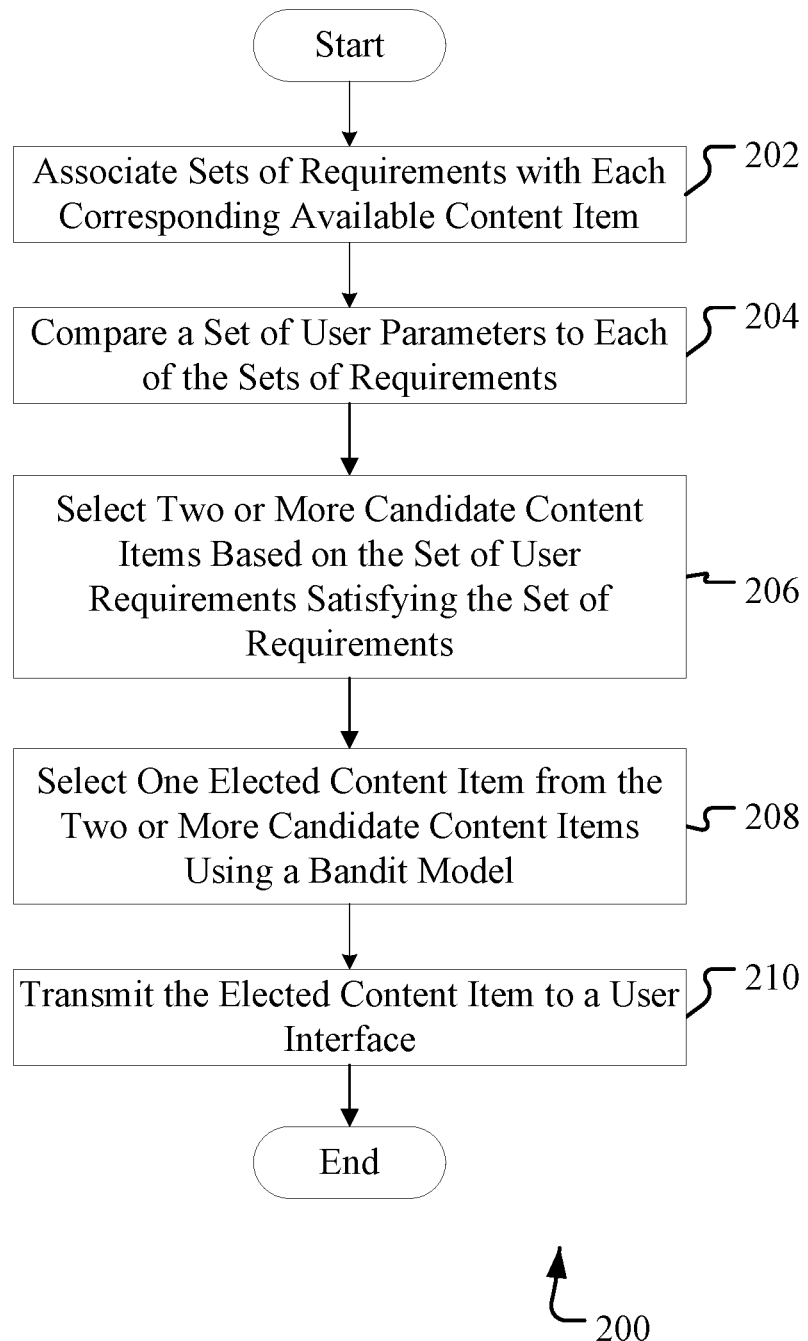
FIG. 2 illustrates an example method for selection of candidate content items.

FIG. 2 illustrates an example method for selection of candidate content items. The example method will be described with respect to an example implementation. In the example implementation, an example user will have user parameters associated with the user or the user's account or dashboard. In the example implementation, the user parameters may be that the user is based in California, the user has a retail storefront, the user sells handmade crafts, the user has made sales to customers in California, New York, and Arizona, the user has made less than $100,000 per year in revenue, and the user has received funding for the business in the form of a loan. In the example implementation, there are five available content items. Content Item A is a promotion for a new accounting revenue recognition compliance feature for service providers in Japan. Content Item B is a multi-state sales tax compliance feature for United States based customers selling product in multiple states. Content Item C is a promotion for a corporate card usage monitoring feature. Content Item D is a loan status monitoring feature. Finally, Content Item E is a promotion for carbon removal.

Example method 200 begins at operation 202 as each set of requirements is associated with a corresponding available content item. In an implementation, database 102 stores associations between the available content items and the sets of requirements. In examples, the sets of requirements are loaded from database 102. Operation 202 may be implemented using content database 102. In the example implementation, Content Items A-E are each associated with a set of requirements. In the example implementation, the set of requirements associated with Content Item A are: (1) the user is based in Japan, (2) the user is a service provider, and (3) the user has annual revenue of greater than 50 million Yen. In the example implementation, the set of requirements associated with Content Item B are: (1) the user is based in the United States, (2) the user is selling goods subject to sales tax, (3) the user sells product outside of their home state, and (4) the user does not already have the multi-state sales tax compliance feature in their dashboard. In the example implementation, the set of requirements associated with Content Item C are: (1) the user has corporate cards issued to employees, (2) the corporate cards are used regularly, and (3) the user does not already have the corporate card usage monitoring feature in their dashboard. In the example implementation, the set of requirements associated with Content Item D are: (1) the user has a loan and (2) the user does not already have the loan status monitoring feature in their dashboard. Finally, in the example implementation, the set of requirements associated with Content Item E are: (1) the user is not signed up for a carbon removal service.

Example method 200 continues with operation 204 as a set of user parameters is compared to each set of requirements. In examples, a user parameter may be compared to a requirement. In examples, user parameters may include user's location, user's gross sales volume, list of user's activated products, number of times the user has already been presented with the content item, and the like. In the example implementation, the user parameters, such as the user being based in California, the user has made sales to customers in California, New York, and Arizona, and the like are compared to the set of requirements for each of Content Items A-E (e.g. the available content items). At operation 206 of the example method, two or more candidate content items are selected based on the set of user parameters satisfying the set of requirements. Operations 204 and 206 may be implemented using comparison module 110. In the example implementation, Content Item A is excluded after the comparison, as the user is not in Japan, and the like. In the example implementation, Content Item C is also excluded after the comparison, as the user does not have corporate cards issues to employees, and the like. Therefore, in the example implementation, the two or more candidate content items selected are Content Item B, Content Item D, and Content Item E. In various implementations, a ranking or scoring method (not shown in FIG. 2) may be used to give each of the selected candidate content items a score. For example, Content Item B and Content Item D may be given equal scores (e.g. 85), whereas Content Item E may be given a lower score (e.g. 70). In examples, the scoring may be based on a relevance to the user.

Example method 200 continues with operation 208 as one elected content item from the two or more candidate content items is selected using a multi-armed bandit model. Operation 208 may be implemented using bandit module 118 and multi-armed bandit model 120. Generally, a bandit model may be a method for sequentially sampling between multiple possible candidate content items such that it favors higher-performing candidate content items more often while balancing a need to simultaneously explore or estimate the performance of other candidate content items. In examples, a beta-binomial Thompson sampling model may implement the bandit model. In examples, for each possible candidate content item, the bandit model may build a Bayesian model of each candidate content item's CTR probability starting with a Beta prior distribution for the CTR probability. In examples, for each candidate content item, the number of times it was loaded and then clicked is recorded. This count may then be used to update the posterior distribution of the CTR probability for each candidate content item. In examples, a random sample is taken from the posterior distribution of each candidate content item's CTR probability and the candidate content item with the highest sampled value is selected as the elected content item. In an implementation, the bandit module selects from among a set of available bandit models 136 based on the particular set of two or more candidate content items. In examples, as multiple ties between candidate content items may occur, more than one bandit model may be used by the bandit module 118 to resolve all of the ties.

In examples, the multi-armed bandit model may be a Thompson sampling-based multi-armed bandit that uses observed CTR to break ties between the two or more candidate content items. In such implementations, this model would be a probabilistic way of breaking ties where each candidate content item is associated with a posterior distribution of its true CTR based on its observed CTR. In such implementations, higher-performing candidate content items would naturally be sampled more often, but lower-performing candidate content items would still be sampled occasionally to observe their performance in a case of their performance changing over time.

In the example implementation, the bandit module, such as bandit module 118, is provided with a set of tied candidate content items (e.g. {Content Item B, Content Item D}). In the example implementation, the bandit module then selects a bandit model, such as bandit model 120, that has been trained to break ties, such as the tie between Content Item B and Content Item D. In examples, prior-collected CTR data may be used to train the bandit model. In the example implementation, based upon the prior-collected CTR data, Content Item B is given a weight of 0.75 and Content Item D is given a weight of 0.25. Therefore, in the example implementation, Content Item B is selected as the elected content item using the bandit model.

Example method 200 completes with operation 210 as the elected content item is transmitted to a user interface. Operation 210 may be implemented using user interface module 126. In the example implementation, Content Item B is transmitted to the user interface. In examples, Content Item B may be displayed in the viewport of the dashboard.

Figure 3:
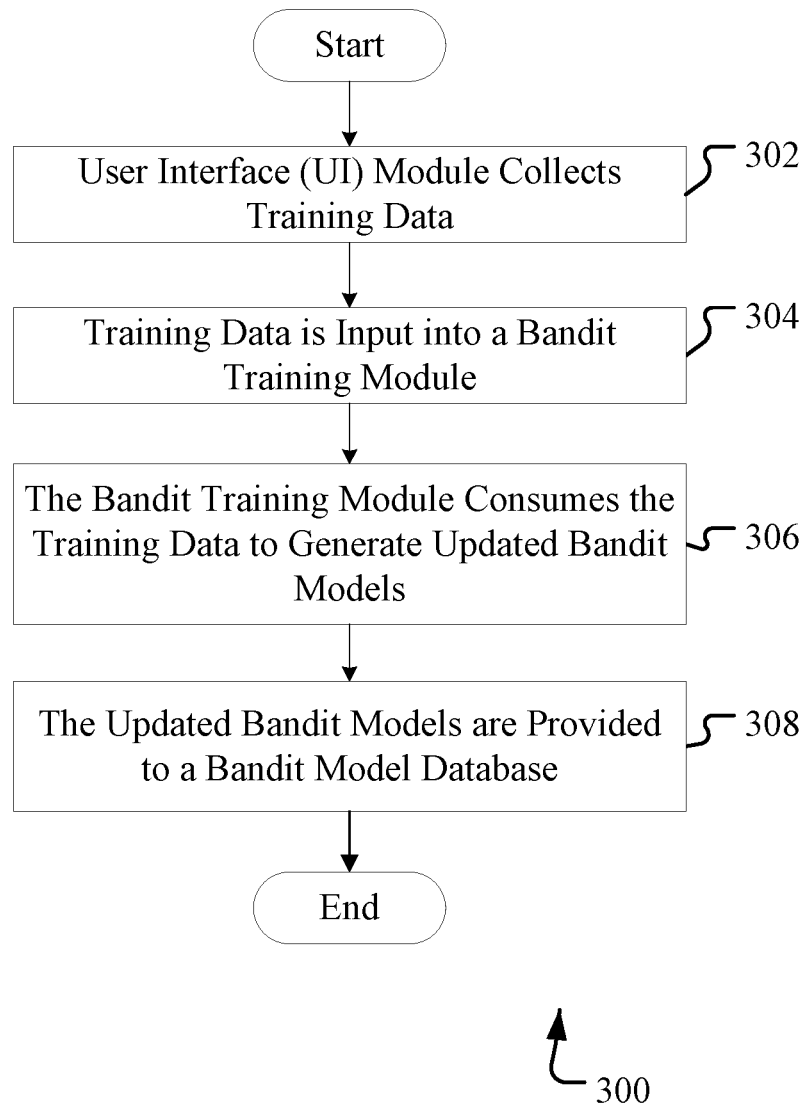
FIG. 3 illustrates an example method implemented by a training module.

FIG. 3 illustrates an example method implemented by a training module. Example method 300 begins at operation 302 as a UI module collects training data. A user interface module such as UI module 126 may be configured to collect the training data. Example method 300 continues with operation 304 as the training data is input in a bandit training module, such as bandit training module 130. As described above, the training data may be collected by observing user interaction with displayed elected content items. At operation 306 the bandit training module consumes the training data to generate updated bandit models. At operation 308 the updated bandit models are provided to a bandit model database, such as database 134.

Figure 4:
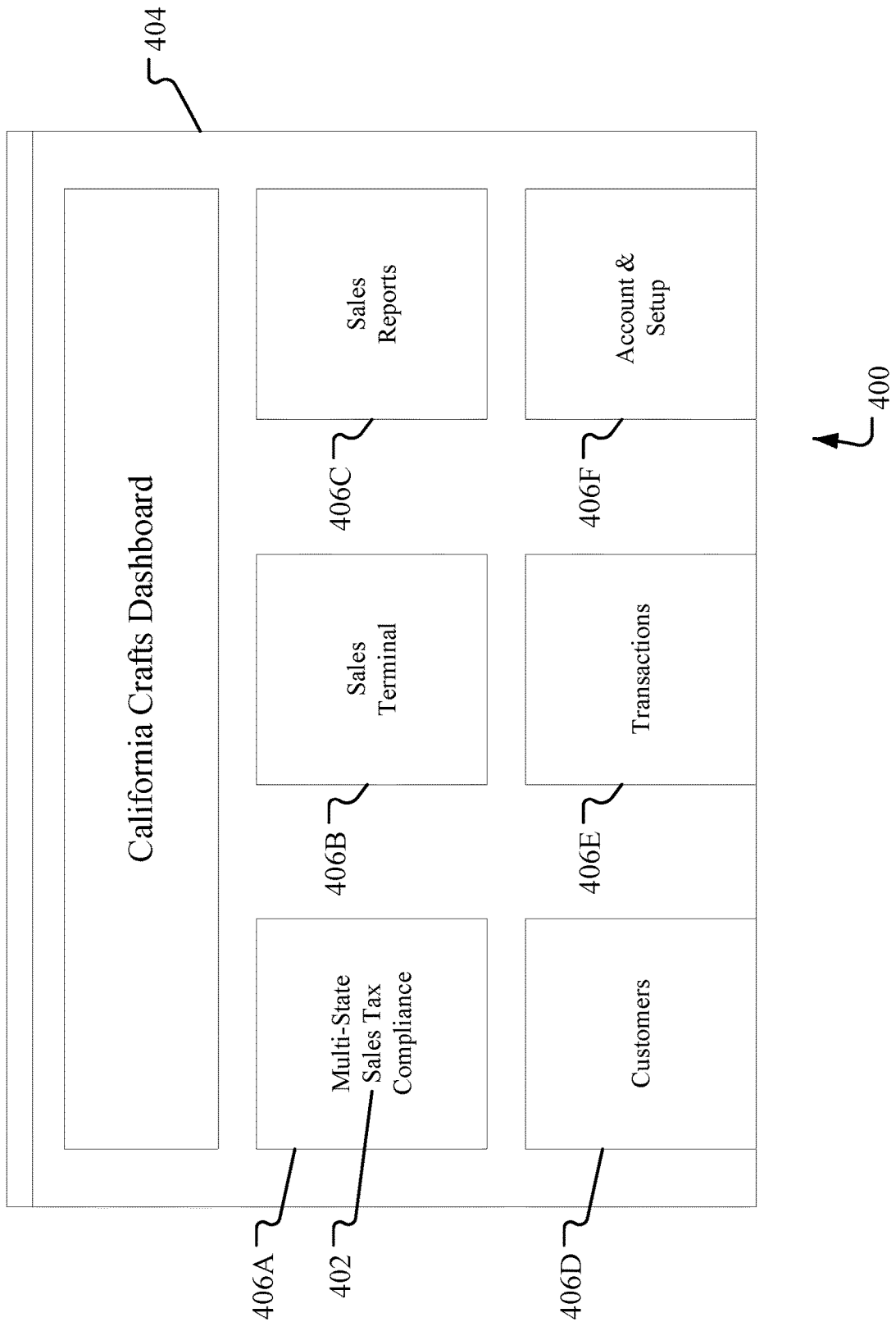
FIG. 4 illustrates an example dashboard configured to display an elected content item.

Referring now to FIG. 4, an example dashboard 400 configured to display an elected content item 402 is illustrated. As illustrated, the dashboard may be configured to be displayed via a web-based application display 404, such as a webpage or other application, or the like. In various implementations, the display 404 is included within a graphical user interface configured to process user input and handle system output. As illustrated, the framework defines portions of the display as viewports 406A, 406B, 406C, 406D, 406E, and 406F (collectively "viewport(s) 406") on the dashboard 400 where different available content items can be displayed. Each viewport 406 may have multiple possible available content items that could be displayed within it, and the elected content item 402 may then be loaded into the viewport, such as viewport 406A. In examples, the elected content item 402 is fed as input into user interface ("UI") module. UI module is configured to transmit the elected content item 402 to a display of a computing device, within the viewport, or the like. The dashboard 400 illustrated and discussed with respect to FIG. 4 are for purposes of example and illustration, and, as is understood, a vast number of dashboard configurations may be utilized for practicing aspects of the disclosure, described herein, including that viewports 406 may have different candidate content items that may be placed in them, or displayed within them, and the exemplary content within viewports 406 shown in FIG. 4 are for illustrative purposes only. The methods described above may be used to select between various candidate content items, including using a corresponding bandit model to break ties between those candidate content items, as described above.

Figure 5:
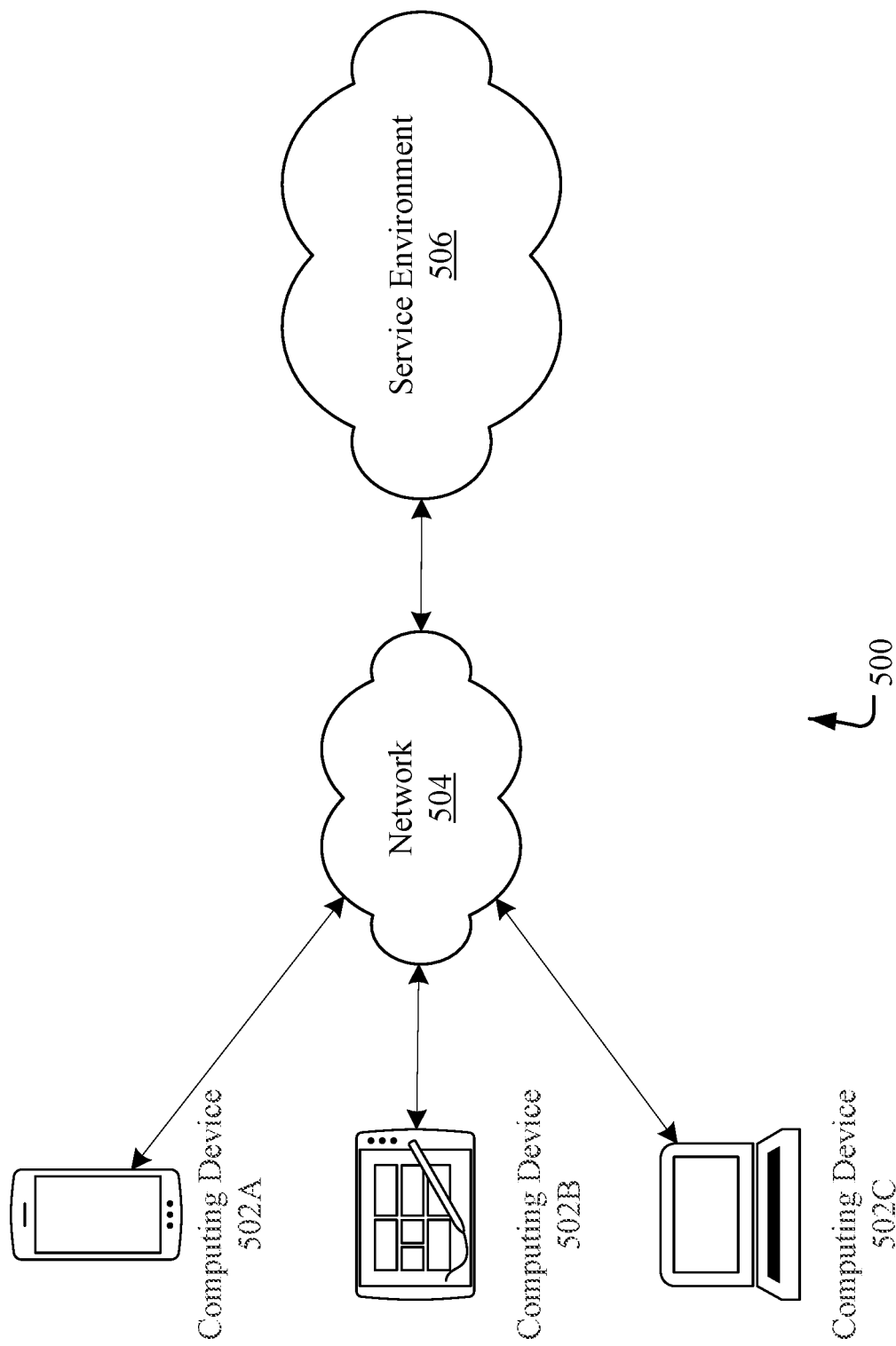
FIG. 5 illustrates an example service environment and computing devices that implement the systems and methods.

FIG. 5 illustrates an example service environment and computing devices that implement the systems and methods. Example system 500 includes computing devices 502A, 502B, and 502C (collectively "computing device(s) 502"), network 504, and service environment 506. One of skill in the art will appreciate that the scale and structure of systems such as system 500 may vary and may include additional or fewer components than those described in FIG. 5. As one example, system 500 may include additional networks and/or service environments. As another example, service environment 506 may be implemented in one or more of computing device(s) 502. Examples of computing device(s) 502 include personal computers (PCs), mobile devices (e.g., smartphones, tablets, laptops, personal digital assistants (PDAs)), server devices (e.g., web servers, file servers, application servers, database servers), virtual devices, wearable devices (e.g., smart watches, smart eyewear, fitness trackers, smart clothing, body-mounted devices, head-mounted displays), gaming consoles or devices, and Internet of Things (IoT) devices. Examples of network 504 include a private area network (PAN), a local area network (LAN), a wide area network (WAN), and the like. Although network 504 is depicted as a single network, it is contemplated that network 504 may represent several networks of similar or varying types. As one example, network 504 may be a LAN connecting computing device(s) 502 to a proxy device and a WAN connecting the proxy device to other one or more services or back-end devices.

Computing device(s) 502 may be configured to detect and/or collect input data from one or more users or devices. In some examples, the input data corresponds to user interaction with one or more software applications or services implemented by, or accessible to, computing device(s) 502. In other examples, the input data corresponds to automated interaction with the software applications or services, such as the automatic (e.g., non-manual) execution of scripts or sets of commands at scheduled times or in response to predetermined events. The user interaction or automated interaction may be related to the performance of an activity, such as a task, a project, or a data request. The input data may include, for example, voice input, touch input, text-based input, gesture input, video input, and/or image input. In one example, the input data is streaming data (e.g., an audio stream or a video stream). In one example, the input data may be a currently uploading data file or a previously uploaded data file. The input data may be detected and/or collected using one or more sensor components of computing device(s) 502. Examples of sensors include microphones, touch-based sensors, geolocation sensors, accelerometers, optical/magnetic sensors, gyroscopes, keyboards, and pointing/selection tools.

Computing device(s) 502 may be further configured to process the input data. In some implementations, computing device(s) 502 associate each set of requirements with a corresponding available content item of a plurality of available content items. Computing device(s) 502 may also compare a set of user parameters to each set of requirements and select two or more candidate content items based on the set of user parameters satisfying the set of requirements. Computing device(s) 502 may also select an elected content item from the two or more candidate content items using a multi-armed bandit model. Computing device(s) 502 may also transmit the elected content item to a display of the computing device(s) 502 or to service environment 506 via network 504. In various implementations, the systems and methods may also be implemented on, or carried out within, service environment 506. Individual components of system 100, such as the comparison module, bandit module, and user interface module, may also be implemented on computing device(s) 502 or within service environment 506.

Service environment 506 is configured to provide computing device(s) 502 access to various computing services and resources (e.g., applications, devices, storage, processing power, networking, analytics, intelligence). Service environment 506 may be implemented in a cloud-based or server-based environment using one or more computing devices, such as server devices (e.g., web servers, file servers, application servers, database servers), PCs, virtual devices, and mobile devices. These computing devices may include one or more sensor components, as discussed with respect to computing device(s) 502. Service environment 506 may include numerous hardware and/or software components and may be subject to one or more distributed computing models or services (e.g., Infrastructure as a Service (IaaS), Platform as a Service (PaaS), Software as a Service (SaaS), Functions as a Service (FaaS)). In some examples, service environment 506 provides input data to computing device(s) 502 and data resulting from analysis or processing received from computing device(s) 502. In at least one example, computing device(s) 502 use service environment 506 to process, at least in part, the input data.

With respect to FIG. 6, a variety of operating environments in which aspects of the disclosure may be practiced will be discussed. However, the device and system illustrated and discussed with respect to FIG. 6 are for purposes of example and illustration, and, as is understood, a vast number of computing device configurations may be utilized for practicing aspects of the disclosure, described herein.

Figure 6:
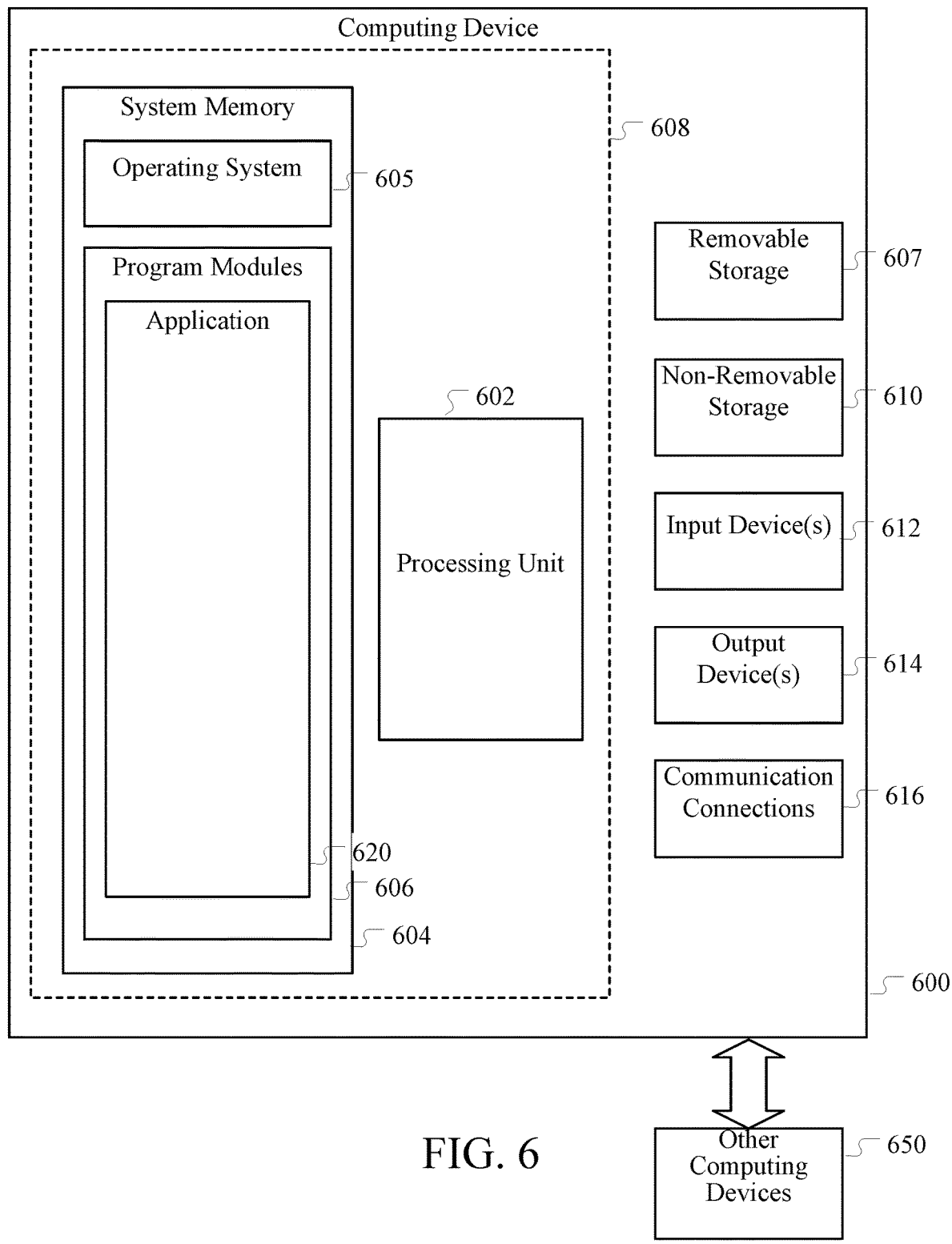
FIG. 6 illustrates a block diagram illustrating example physical components of a computing device for executing one or more aspects of the present disclosure.

FIG. 6 illustrates a block diagram illustrating physical components (e.g., hardware) of a computing device 600 with which aspects of the disclosure may be practiced. The computing device components described below may be suitable for the computing devices and systems described above. In a basic configuration, the computing device 600 includes at least one processing unit 602 and a system memory 604. Depending on the configuration and type of computing device, the system memory 604 may include volatile storage (e.g., random access memory), non-volatile storage (e.g., read-only memory), flash memory, or any combination of such memories.

The system memory 604 includes an operating system 605 and one or more program modules 606 suitable for running software application 620, such as one or more components supported by the systems described herein. The operating system 605, for example, may be suitable for controlling the operation of the computing device 600.

Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may include additional data storage devices (removable and/or non-removable) such as, for example, magnetic disks, optical disks, tape, and other computer readable media. Such additional storage is illustrated in FIG. 6 by a removable storage device 607 and a non-removable storage device 610.

The term computer readable media as used herein includes computer storage media. Computer storage media includes volatile and nonvolatile, removable and non-removable media implemented in any method or technology for storage of information, such as computer readable instructions, data structures, or program modules. The system memory 604, the removable storage device 607, and the non-removable storage device 610 are all computer storage media examples (e.g., memory storage). Computer storage media may include random access memory (RAM), read-only memory (ROM), electrically erasable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

As stated above, a number of program modules and data files may be stored in the system memory 604. While executing on the processing unit 602, the program modules 606 (e.g., application 620) may perform processes including the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 400 on the single integrated circuit (chip). Embodiments of the disclosure may also be practiced using other technologies capable of performing logical operations such as, for example, AND, OR, and NOT, including mechanical, optical, fluidic, and quantum technologies. In addition, embodiments of the disclosure may be practiced within a general-purpose computer or in any other circuits or systems.

The computing device 600 may also have one or more input device(s) 612 such as a keyboard, a mouse, a pen, a sound or voice input device, a touch or swipe input device, etc. Output device(s) 614 such as a display, speakers, a printer, etc. may also be included. The aforementioned devices are examples and others may be used. The computing device 600 may include one or more communication connections 616 allowing communications with other computing devices 640. Examples of suitable communication connections 616 include radio frequency (RF) transmitter, receiver, and/or transceiver circuitry; universal serial bus (USB), parallel, and/or serial ports.

The computing device 600 may also be a mobile computing device such as, for example, a mobile telephone (e.g., a smart phone), wearable computer (such as a smart watch), a tablet computer, a laptop computer, and the like, with which embodiments of the disclosure may be practiced. In some aspects, the client device is a mobile computing device. A mobile computing device implementing the system 600 may have additional features or functionality. For example, the mobile computing device may also include additional data storage devices (removable and/or non-removable) such as, magnetic disks, optical disks, or tape.

Data/information generated or captured by the mobile computing device and stored via the system 600 may be stored locally on the mobile computing device, as described above, or the data may be stored on any number of storage media that may be accessed by the device via the radio interface layer or via a wired connection between the mobile computing device and a separate computing device associated with the mobile computing device, for example, a server computer in a distributed computing network, such as the Internet. As should be appreciated such data/information may be accessed via the mobile computing device via the radio interface layer or via a distributed computing network. Similarly, such data may be readily transferred between computing devices for storage and use according to well-known data transfer and storage means, including electronic mail and collaborative data sharing systems.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
a processor;
a memory coupled to the processor, the memory comprising:
a plurality of sets of requirements, each set of the plurality of sets of requirements associated with a corresponding available content item of a plurality of available content items;
a comparison module configured to compare a set of user parameters to each set of the plurality of sets of requirements, rank the plurality of available content items based on the set of user parameters satisfying one or more set of requirements, determine that a first combination of two or more candidate content items are tied, and select the first combination of the two or more candidate content items;
a bandit module comprising a plurality of bandit models, the plurality of bandit models trained to break ties between different combinations of the plurality of available content items, the plurality of bandit models comprising a first bandit model trained to break ties between the first combination of the two or more candidate content items and a second bandit model trained to break ties between a second combination of two or more candidate content items, the first combination being different from the second combination,
the bandit module configured to:
select the first bandit model from the plurality of bandit models, the first bandit model trained to break ties between the first combination of the two or more candidate content items;

input the first combination of two or more candidates content items into the first bandit model selected from the plurality of bandit models; and receive an output from the first bandit model, the output including a content item selected from the first combination of the two or more candidate content items by the first bandit model; and a user interface module comprising a modularization framework, the modularization framework defining one or more context-aware viewports that display the content item selected from the first combination of the two or more candidate content items by the first bandit model in a context-aware viewport of the one or more context-aware viewports, wherein the content item appears in a predefined region of the display.

2. The system of claim 1, wherein the memory further comprises a plurality of multi-armed bandit models, the bandit module configured to select one multi-armed bandit model from the plurality of multi-armed bandit models based on two or more candidate content items selected.

3. The system of claim 1, wherein the memory further comprises a scoring module configured to score the first combination of the two or more candidate content items based on the set of user parameters satisfying the one or more set of requirements.

4. The system of claim 1, wherein the plurality of available content items comprise promotional content.

5. The system of claim 1, wherein the set of user parameters comprises user location and user current products.

6. The system of claim 1, wherein the first bandit model randomly selects the content item selected from the first combination of the two or more candidate content items based on a weight associated with each of the first combination of the two or more candidate content items.

7. The system of claim 6, wherein the memory further comprises a bandit training module configured to collect user session data and the bandit module configured to calculate the weight associated with each of the first combination of the two or more candidate content items using the user session data.

8. A method comprising:

associating each set of requirements of a plurality of sets of requirements with a corresponding available content item of a plurality of available content items;

comparing a set of user parameters to each set of requirements of the plurality of sets of requirements;

ranking the plurality of available content items based on the set of user parameters satisfying one or more set of requirements of the plurality of sets of requirements;

determining that a first combination of two or more candidate content items are tied and selecting the first combination of the two or more candidate content items;

selecting a first bandit model from a plurality of bandit models based on the first combination of the two or more candidate content items, the plurality of bandit models trained to break ties between respective combinations of tied candidate content items, the plurality of bandit models comprising the first bandit model trained to break ties between the first combination of the two or more candidate content items and a second bandit model trained to break ties between a second combination of two or more candidate content items, the first combination being different from the second combination;

inputting the first combination of the two or more candidates content items into the first bandit model;

receiving an output from the first bandit model, the output including a content item selected from first the combination of the two or more candidate content items by the first bandit model; and transmitting the content item to a user interface comprising a modularization framework, the modularization framework defining one or more context-aware viewports that display the content item selected from the first combination of the two or more candidate content items by the first bandit model in a context-aware viewport of the one or more context-aware viewports, wherein the content item appears in a predefined region of the display.

9. The method of claim 8, further comprising selecting one multi-armed bandit model from a plurality of multi-armed bandit models based on two or more candidate content items selected.

10. The method of claim 8, further comprising scoring the first combination of the two or more candidate content items based on the set of user parameters satisfying the one or more set of requirements.

11. The method of claim 8, wherein the plurality of available content items comprise promotional content.

12. The method of claim 8, wherein the set of user parameters comprises user location and user current products.

13. The method of claim 8, wherein a bandit training module collects user session data and the bandit training module calculates a weight associated with each of the first combination of the two or more candidate content items using the user session data.

14. The method of claim 13, wherein the first bandit model randomly selects the content item selected from the first combination of the two or more candidate content items based the weight associated with each of the first combination of the two or more candidate content items.

15. A non-transitory computer readable storage medium, the computer-readable storage medium including instructions that when executed by a computer having at least a processor and a memory coupled to the processor, cause the computer to perform a method comprising:

associating each set of requirements of a plurality of sets of requirements with a corresponding available content item of a plurality of available content items;

comparing a set of user parameters to each set of requirements of the plurality of sets of requirements;

ranking the plurality of available content items based on the set of user parameters satisfying one or more set of requirements of the plurality of sets of requirements;

determining that a first combination of two or more candidate content items are tied and selecting the first combination of the two or more candidate content items;

selecting a first bandit model from a plurality of bandit models based on the first combination of the two or more candidate content items, the plurality of bandit models trained to break ties between respective combinations of tied candidate content items, the plurality of bandit models comprising the first bandit model trained to break ties between the first combination of the two or more candidate content items and a second bandit model trained to break ties between a second combination of two or more candidate content items, the first combination being different from the second combination;

inputting the first combination of the two or more candidates content items into the first bandit model;

receiving an output from the first bandit model, the output including a content item selected from the first combination of the two or more candidate content items by the first bandit model; and transmitting the content item to a user interface comprising a modularization framework, the modularization framework defining one or more context-aware viewports that display the content item selected from the first combination of the two or more candidate content items by the first bandit model in a context-aware viewport of the one or more context-aware viewports, wherein the content item appears in a predefined region of the display.

16. The non-transitory computer readable storage medium of claim 15, the method further comprises selecting one multi-armed bandit model from a plurality of multi-armed bandit models based on two or more candidate content items selected.

17. The non-transitory computer readable storage medium of claim 15, the method further comprises scoring the first combination of the two or more candidate content items based on the set of user parameters satisfying the one or more set of requirements.

18. The non-transitory computer readable storage medium of claim 15, wherein the plurality of available content items comprise promotional content.

19. The non-transitory computer readable storage medium of claim 15, wherein the set of user parameters comprises user location and user current products.

20. The non-transitory computer readable storage medium of claim 15, wherein the first bandit model randomly selects the content item selected from the first combination of the two or more candidate content items based on a weight associated with each of the first combination of the two or more candidate content items.

* * * * *